US009779075B2

(12) United States Patent
Bhatt et al.

(10) Patent No.: US 9,779,075 B2
(45) Date of Patent: *Oct. 3, 2017

(54) RELEVANCY OF COMMUNICATIONS ABOUT UNSTRUCTURED INFORMATION (71) Applicant: International Business Machines Corporation, Armonk, NY (US)

(72) Inventors: Dhruv A. Bhatt, Indian Trail, NC (US); Kristin E. McNeil, Charlotte, NC (US); Nitaben A. Patel, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/303,874

(22) Filed: Jun. 13, 2014

(65) Prior Publication Data

US 2015/0178262 A1    Jun. 25, 2015

Related U.S. Application Data

(63) Continuation of application No. 14/137,595, filed on Dec. 20, 2013.

(51) Int. Cl.
*G06F 17/00* (2006.01)
*G06F 17/24* (2006.01)
*G06F 17/30* (2006.01)

(52) U.S. Cl.
CPC ...... *G06F 17/241* (2013.01); *G06F 17/30876* (2013.01)

(58) Field of Classification Search
CPC ............. G06F 17/241; G06F 17/30864; G06F 17/30876
See application file for complete search history.

(56) References Cited

U.S. PATENT DOCUMENTS 5,640,553 A * 6/1997 Schultz ............ G06F 17/30687
5,717,914 A * 2/1998 Husick ............ G06F 17/30707
(Continued)

FOREIGN PATENT DOCUMENTS

CN    102254038    11/2011

OTHER PUBLICATIONS

R. Mack et al., Text analytics for life science using Unstructured Information Management Architecture, IBM Systems Journal, vol. 43, No. 3, 2004, p. 490-515.*

(Continued)

*Primary Examiner* — Laurie Ries
(74) *Attorney, Agent, or Firm* — Konrad Raynes Davda & Victor LLP; Janaki K. Davda (57) ABSTRACT

Provided are a method, computer program product, and system for relevant communications about unstructured information. Determining a relevant knowledge domain for the unstructured information. Generating one or more unstructured information annotations with a text analyzer, wherein the text analyzer is configured with at least one annotator related to the relevant knowledge domain. Generating one or more communication annotations for each of one or more communications with the configured text analyzer. Determining a relevance factor for each of the one or more communications based in part upon a comparison of the communication annotations to the information annotations. Presenting the communications with a relevance factor greater than a threshold relevance.

7 Claims, 5 Drawing Sheets

(56) References Cited

U.S. PATENT DOCUMENTS

| | | | | |
|---|---|---|---|---|
| 6,651,059 | B1* | 11/2003 | Sundaresan | G06F 17/30734 |
| 7,219,054 | B1* | 5/2007 | Begeja | G10L 15/1822 |
| | | | | 704/231 |
| 7,610,192 | B1* | 10/2009 | Jamieson | G06Q 50/22 |
| | | | | 704/1 |
| 8,073,947 | B1 | 12/2011 | Yeh et al. | |
| 8,132,154 | B2 | 3/2012 | Bank et al. | |
| 8,341,150 | B1 | 12/2012 | Riley et al. | |
| 8,832,092 | B2* | 9/2014 | Spivack | G06F 17/275 |
| | | | | 707/723 |
| 9,230,240 | B2* | 1/2016 | Iwasaki | G06Q 10/10 |
| 2006/0161534 | A1* | 7/2006 | Carson | G06F 17/30864 |
| 2006/0224682 | A1* | 10/2006 | Inmon | G06F 17/27 |
| | | | | 709/206 |
| 2007/0100914 | A1* | 5/2007 | Agrawal | G06F 17/30616 |
| 2007/0156683 | A1* | 7/2007 | Wolff | G06F 17/30011 |
| 2009/0112841 | A1* | 4/2009 | Devarakonda | G06F 17/30731 |
| 2009/0307215 | A1* | 12/2009 | Ball | G06F 17/30867 |
| 2010/0125531 | A1 | 5/2010 | Wong | |
| 2010/0332508 | A1* | 12/2010 | Gustafson | G06Q 30/02 |
| | | | | 707/759 |
| 2011/0093464 | A1* | 4/2011 | Cvet | G06F 17/3071 |
| | | | | 707/737 |
| 2011/0145219 | A1 | 6/2011 | Cierniak et al. | |
| 2011/0161413 | A1* | 6/2011 | Cierniak | G06F 17/3089 |
| | | | | 709/203 |
| 2011/0246442 | A1* | 10/2011 | Bartell | G06F 17/3087 |
| | | | | 707/709 |
| 2011/0282893 | A1* | 11/2011 | Dolin | G06Q 10/10 |
| | | | | 707/769 |
| 2012/0216245 | A1 | 8/2012 | Vignisson et al. | |
| 2012/0330938 | A1 | 12/2012 | Lee et al. | |
| 2012/0330968 | A1* | 12/2012 | Lee | G06F 17/30722 |
| | | | | 707/748 |
| 2013/0041901 | A1 | 2/2013 | Nikankin | |
| 2013/0117261 | A1 | 5/2013 | Sambrani | |
| 2013/0159277 | A1 | 6/2013 | Liu et al. | |
| 2016/0224662 | A1* | 8/2016 | King | G06F 17/30705 |

OTHER PUBLICATIONS

English Abstract for CN102254038A, published on Nov. 23, 2011, Total 1 p.

Lee, Y., M. Bae, G. Woo, and H. Cho, "A Personalized Visualizing and Filtering System for a Large Set of Responding Messages on Internet Discussion Forums", IEEE Ninth International Conference on Computer and Information Technology, © 2009 IEEE, Dec. 1, 2009, DOI 10.1109/CIT.2009.131, Total 6 pp.

Preliminary Amendment, Jun. 11, 2014, for U.S. Appl. No. 14/137,595, filed Dec. 20, 2013 by D.A. Bhatt et al., Total 7 pp. [PrelimAmend (57.350)].

U.S. Appl. No. 14/137,595, filed Dec. 20, 2013, entitled "Relevancy of Communications About Unstructured Information", invented by D.A. Bhatt et al., Total 26 pp. [57.350 (Appln)].

Office Action 1, Sep. 24, 2015, for U.S. Appl. No. 14/137,595, filed Dec. 20, 2013 by D.A. Bhatt et al., Total 26 pp. [57.350 (OA1)].

Response to Office Action 1, Dec. 22, 2015, for U.S. Appl. No. 14/137,595, filed Dec. 20, 2013 by D.A. Bhatt et al., Total 12 pp. [57.350 (ROA1)].

Final Office Action, Apr. 6, 2016, for U.S. Appl. No. 14/137,595, filed Dec. 20, 2013 by D.A. Bhatt et al., Total 23 pp. [57.350 (FOA)].

Response to Final Office Action, Jul. 6, 2016, for U.S. Appl. No. 14/137,595, filed Dec. 20, 2013 by D.A. Bhatt et al., Total 14 pp. [57.350 (RFOA)].

Office Action 3, Feb. 15, 2017, for U.S. Appl. No. 14/137,595, filed Dec. 20, 2013 by D.A. Bhatt et al., Total 13 pp. [57.350 (OA3)].

Response to Office Action 3, May 10, 2017, for U.S. Appl. No. 14/137,595, filed Dec. 20, 2013 by D.A. Bhatt et al., Total 8 pp. [57.350 (ROA3)].

Notice of Allowance 1, dated May 26, 2017, for U.S. Appl. No. 14/137,595, 14 pages.

* cited by examiner

| DOMAIN (202) | ANNOTATOR (204) | |
|---|---|---|
| MEDICAL | SYMPTOMS | 210 |
| MEDICAL | HOSPITALS | 220 |
| MEDICAL | ILLNESS | 230 |
| COUNTRY | CITIES | 240 |
| COUNTRY | LEADERS | 250 |

RELEVANCY OF COMMUNICATIONS ABOUT UNSTRUCTURED INFORMATION

BACKGROUND OF THE INVENTION

The present invention relates generally the field of unstructured text analysis, and more particularly to determining the relevancy of user communications about unstructured information (e.g., articles, videos, etc.).

Many web sites solicit comments (communications) from readers about published articles (information). The communications enable readers to contribute additional information, typically in the form of posted comments. The communications generally contain text providing the reader's impression, opinion, or feedback about the published information. For example, an article published about an individual suffering from a serious illness, may prompt feedback from the readership about the illness. Unfortunately, many of the hundreds of communications received may be irrelevant to the topic (e.g., off topic or contain advertisements), or contain duplicate information. Readers may continue to post communications about the published information, but will be unwilling to read through hundreds of irrelevant communications to find the relevant communications. For a small number of communications, authors may remove communications through manual subjective censorship, but this activity does not scale well and is impractical for publications with hundreds of communications.

SUMMARY

Provided are a method, computer program product, and system for relevant communications about unstructured information. Determining a relevant knowledge domain for the unstructured information. Generating one or more unstructured information annotations with a text analyzer, wherein the text analyzer is configured with at least one annotator related to the relevant knowledge domain. Generating one or more communication annotations for each of one or more communications with the configured text analyzer. Determining a relevance factor for each of the one or more communications based in part upon a comparison of the communication annotations to the information annotations. Presenting the communications with a relevance factor greater than a threshold relevance.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Unstructured information and unstructured communications are generally referred to as unstructured content. Unstructured content is defined herein as content whose intended meaning is only implied by its form. One suitable example of unstructured content is a document organized merely into sentences, paragraphs and pages. Other suitable examples of unstructured content include blogs, news, advertisements, comments (communications), and electronic media such as audio or video files. Unstructured content generally contains valuable information often missed in standard text analysis. Unstructured content is often ambiguous and must be analyzed based upon context. "Structured content" is defined herein as information whose intended meaning is unambiguous and explicitly represented in a structure or format of the data. One suitable example of structured content is a database table.

Unstructured text analysis (hereinafter text analysis) is generally understood as a sub-area or component of Natural Language Processing or "NLP." A typical text analyzer involves an "annotator," which is understood in the relevant art as a process, comprising dictionaries and rules, for analyzing text and generating what is known in the art as "annotations." An annotation is an object, with its own properties, used to annotate a sequence of text. There are an arbitrary number of types of annotations. For example, annotations may label sequences of text in terms of their role in the unstructured information (e.g., word, sentence, paragraph, etc.), or to describe them in terms of their grammatical role (e.g., noun, noun phrase, verb, adjective, etc.). Annotators may identify sequences of text; an annotator for identifying medical conditions may identify sequences of text for diseases, injuries, symptoms, or medical recommendations. There is essentially no limit on the number of, or application of, annotations. A text analyzer may use an Unstructured Information Management Architecture (UIMA). UIMA is a component software architecture for analyzing unstructured information. A more detailed reference of UIMA can be obtained from the APACHE SOFTWARE FOUNDATION at http://uima.apache.org/uima-specification.html. It should be understood that any text analytic technologies utilizing NLP may be employed to accomplish the techniques described herein.

Figure 1:
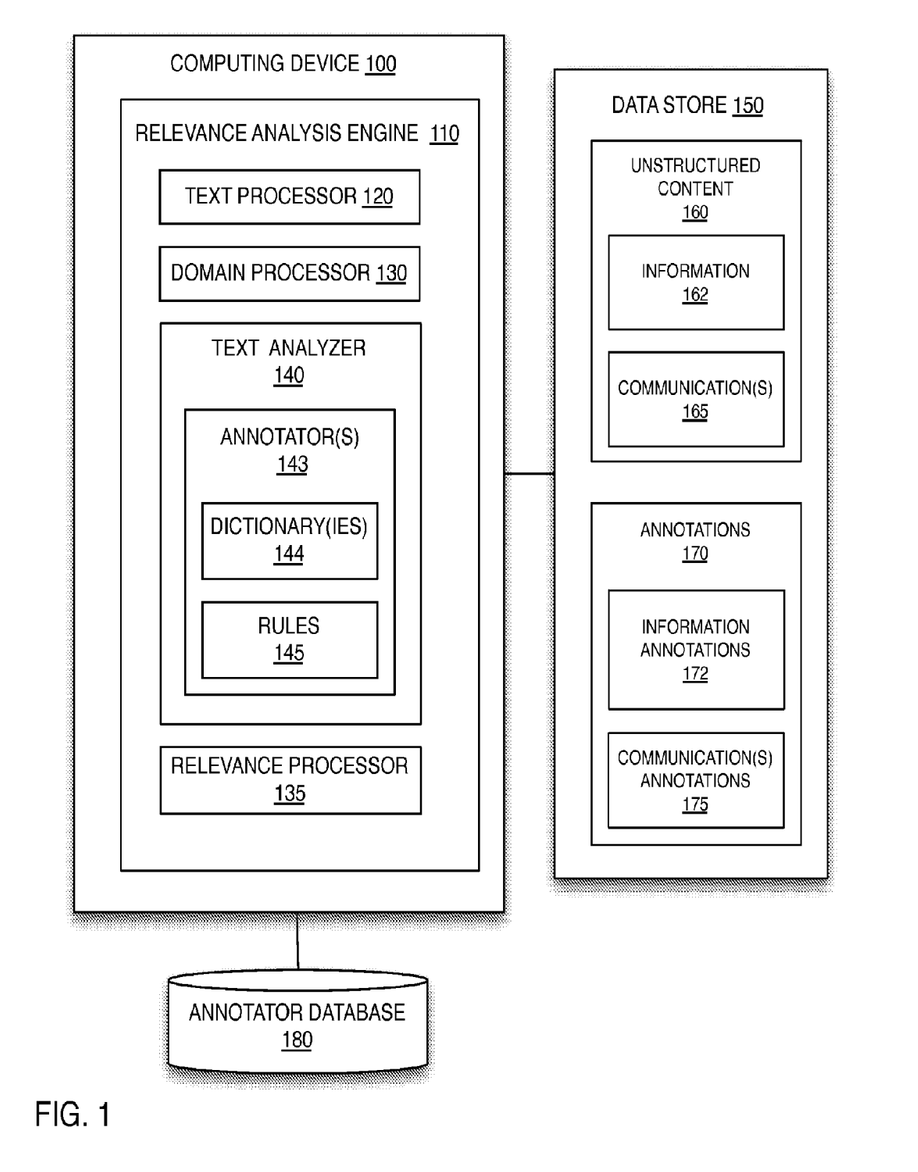
FIG. 1 illustrates a computing architecture in accordance with certain embodiments.
Figure 2:
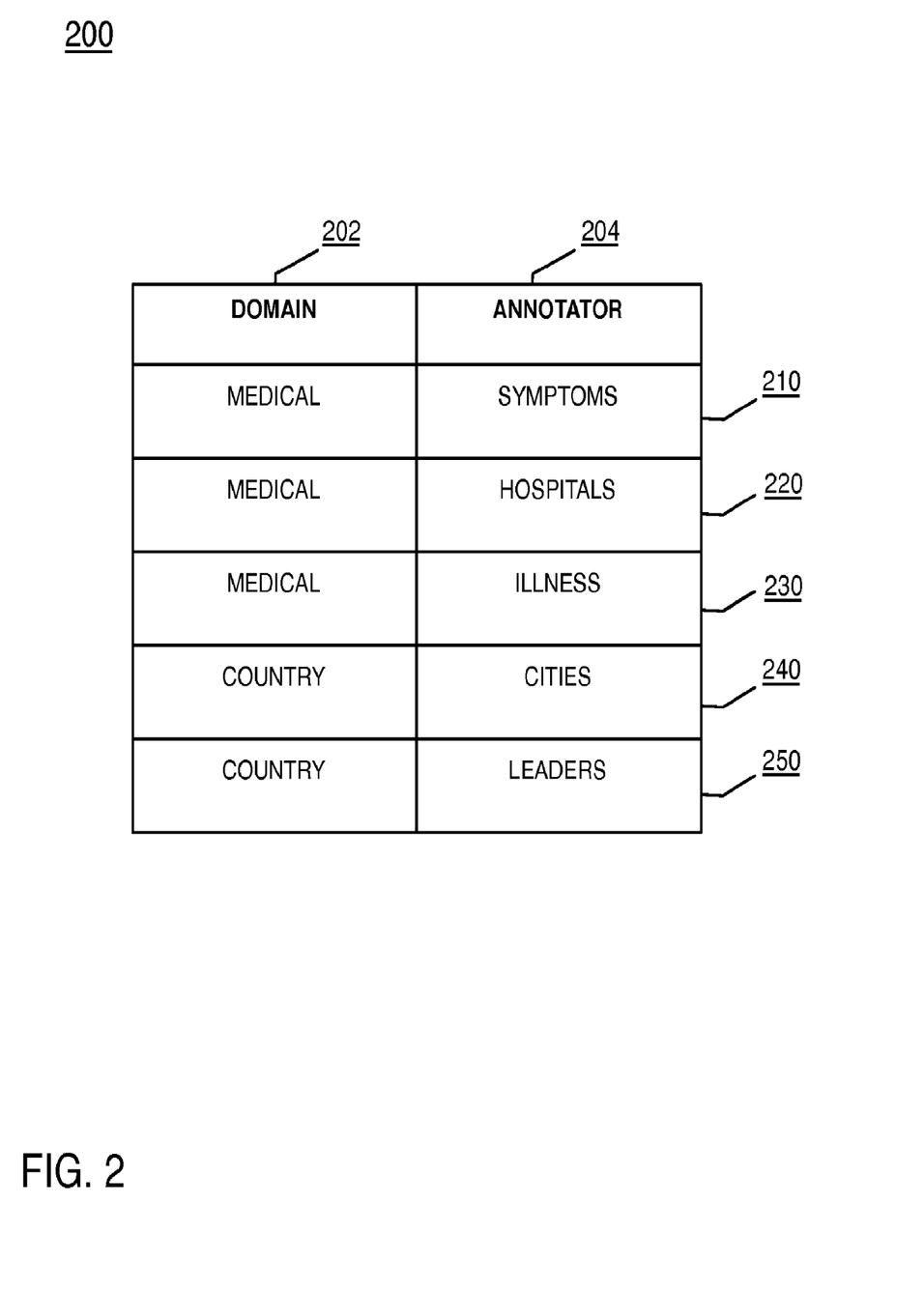
FIG. 2 illustrates an example table in the annotator database, in accordance with certain embodiments.

FIG. 1 illustrates a computing architecture in accordance with certain embodiments. In FIG. 1, a computing device 100 includes a relevance analysis engine 110, and is coupled to a data store 150 and an annotator database 180. FIG. 2. illustrates an example table in annotator database 180, in accordance with certain embodiments. Annotators may be classified based on applicability to a knowledge domain. Knowledge domains, hereinafter domains, is herein defined as an area of human endeavor or specialized discipline. Suitable examples of domains include (but not limited to) medical, geographic, political, and engineering. Annotators are associated with one or more knowledge domains, and in certain embodiments, each annotator has an attribute of its related knowledge domain. Example table 200 includes a domain column 202, and an annotator column 204. Entries in the domain column 202 indicate the names of domains, and the associated records in the annotator column contain an annotator for the domain. In the example illustration, rows 210, 220, and 230 contain annotators related to the medical domain. Row 210 contains the symptoms annotator, row 220 contains the hospitals annotator and row 230 contains the illness annotator. Rows 240 and 250 contain annotators for the country domain. Row 240 contains the cities annotator and row 250 contains the leaders annotator.

The relevance analysis engine 110 includes a text processor 120, a domain processor 130, a text analyzer 140, and a relevance processor 135. The text analyzer 140 includes at least one annotator 143 including dictionaries 144 and rules 145. The data store 150 includes unstructured content 160 and annotations 170. Unstructured content 160 includes unstructured information 162 (hereinafter information) and unstructured communications 165 (hereinafter communications). Annotations 170 include information annotations 172 and communication annotations 175. In certain embodiments, the annotations 170 comprise keywords and/or phrases identified using annotators 143 comprising dictionaries 144 and rules 145. In certain embodiments, the annotations 170 comprise an identifier (or link) to the annotator 143 generating the annotation 170, and further comprise an identifier to the knowledge domain associated with the annotator 143. In exemplary embodiments, the relevance analysis engine 110 generally determines the relevance of communications 165 to information 162 and presents the relevant communications.

Figure 3:
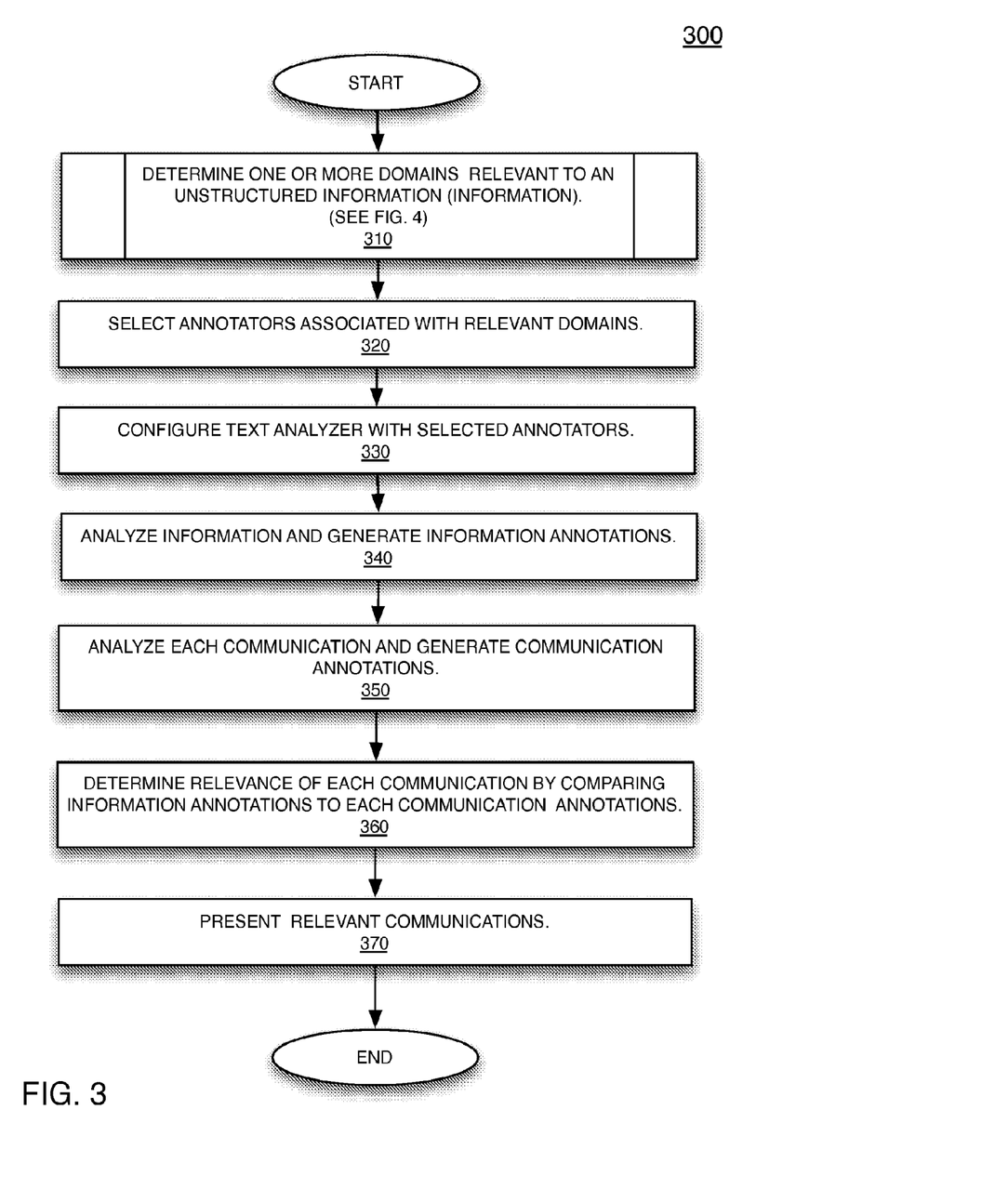
FIG. 3 illustrates, in a flow diagram, operations for presenting relevant communications about unstructured information, in accordance with certain embodiments.

FIG. 3. Illustrates, in a flow diagram, operations 300 for presenting relevant communications about unstructured information, in accordance with certain embodiments. At step 310, discussed in greater detail with reference to FIG. 4, one or more domains are determined to be relevant to information 162. At step 320, one or more annotator associated with relevant domains is selected. In certain embodiments, the one or more annotators are selected using the annotator database 180, which contains column 202 for domains and column 204 for annotators. At step 330, the text analyzer 140 is configured with the one or more selected annotators. In step 340, the configured text analyzer 140 analyzes the information 162 and generates information annotations 172. At step 350, each communication 165 is analyzed and communication annotations 175 are generated.

At step 360, the relevance of each communication is determined by comparing the information annotation 172 and each communication annotation 175. A relevance factor is a measure used to indicate the relevance and is a measure of the strength of relevance. In certain embodiments, the relevance factor for each communication is determined by the frequency of matches wherein the frequency of matches is determined by the number of matches divided by the number of words in the communication. In certain embodiments, relevance factor is determined by evaluating the communication annotations, without considering the information annotations; in such embodiments the existence of communication annotations indicate a relevance to one or more relevant domains; the relevance factor is determined by the number of annotations in the communication divided by the number of words in the communication. In certain embodiments, a threshold relevance must be met before considering the communication to be relevant, where the threshold relevance is a configurable setting. In certain embodiments, a threshold number of matching communication and information annotations must be met, before the communication is considered relevant (in this example the threshold relevance is the minimum number of matching communication and information annotations). In certain embodiments, a relevance factor of zero indicates irrelevant. In certain embodiments, the most relevant knowledge domain associated with the relevant communication is determined to be the knowledge domain most associated with the communication annotations.

At step 370, the relevant communications are presented and processing ends. In certain embodiments, the relevant communications are presented in order of relevance using the relevance factor to indicate those communications with higher relevance. In certain other embodiments, the presentation is organized by domain and relevance. For example, a communication with five annotations from the medical domain and one annotation from the country domain would be presented in the medical domain. In certain embodiments, the communications are presented by domain, in order of relevance. The communications of higher relevance are presented before the communications with lower relevance.

Figure 4:
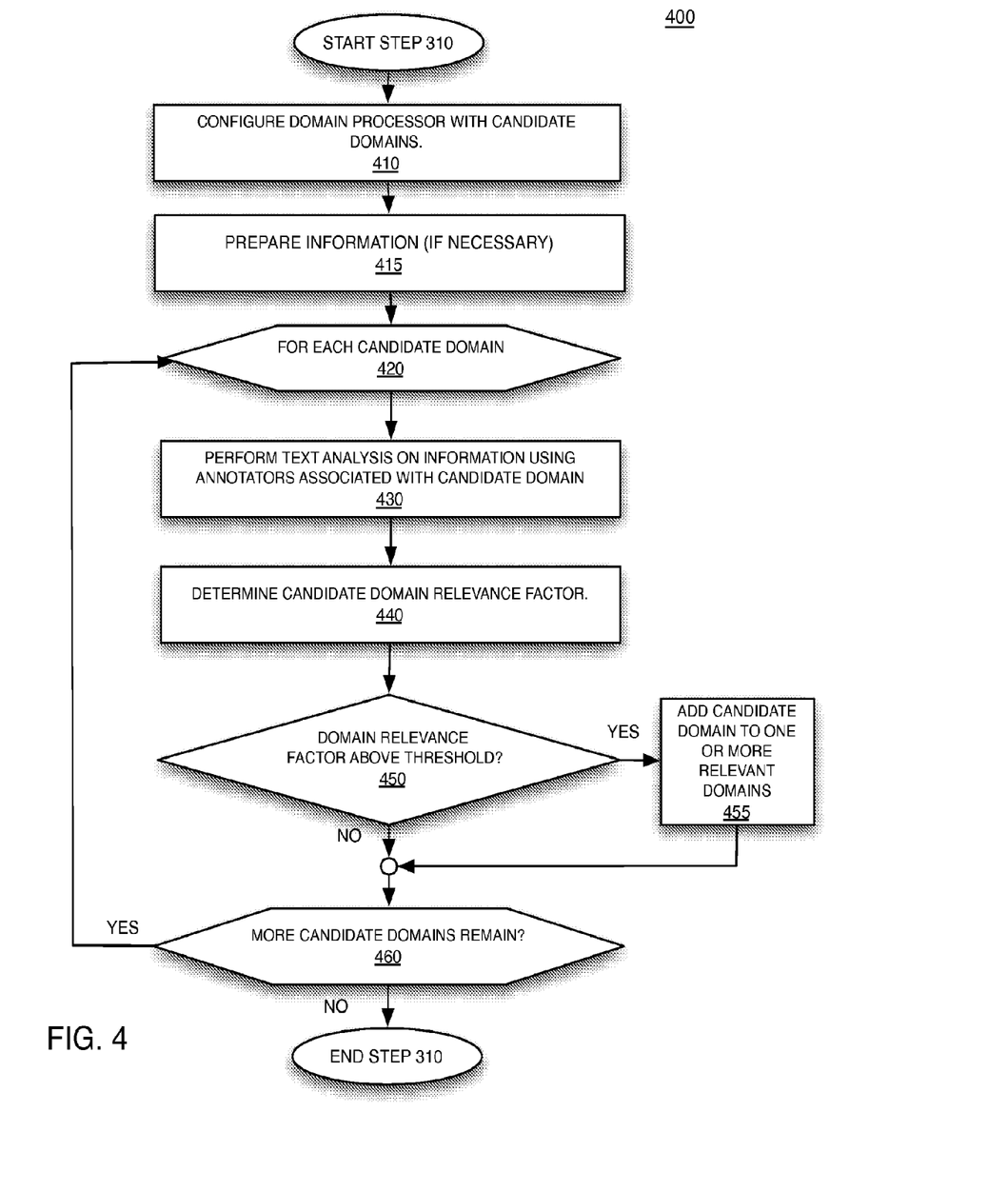
FIG. 4 illustrates in a flow diagram, operations for determining relevant domains of knowledge, in accordance with certain embodiments.

FIG. 4 is the flow chart illustrating operations 400 corresponding to step 310 for determining domains relevant to information, in accordance with certain embodiments. At step 410, the domain processor 130 is configured with candidate domains. In certain embodiments, the domain processor is configured to use a set of candidate domains based on metadata associated with information 162. In certain other embodiments, all the domains in the annotator database 180 will be used as candidate domains. In step 415, information is prepared for text analysis, if necessary. In certain embodiments, domain processor 130 determines if information 162 requires preparation by examining the metadata for information 162. For example. In certain embodiments, if the metadata for information 162 indicates the information is in video format, the text processor 120 is instructed to convert the information to text. At step 420, a loop including steps 420-460 begins for each candidate domain. At step 430, text analysis on information 162 is performed with annotators 143 associated with the candidate domain. In certain embodiments, the text analyzer 140 is configured with candidate domain annotators by the domain processor 130; the domain processor 130 queries the annotator database 180 to determine the annotators associated with the candidate domain; the annotators 143 are retrieved from the annotator database 180 and loaded into the text analyzer 140. The text analyzer 140, configured with the candidate domain annotators, analyzes the information 162 and generates the information annotations 172. In step 440, the candidate domain relevance factor is determined, at least in part, on the information annotations 172. In certain embodiments, the candidate relevance factor is equal to the summation of the information annotations 172 generated. In certain embodiments, the candidate relevance factor is determined, at least in part, on a count of words in the information 162 as compared against the number of information annotations 172 for the candidate domain. In certain other embodiments, each candidate domain has a subset of indicator words and the number of subset words identified in the annotations 172 is divided by the number of words in the information 162 to determine the candidate relevance factor. In step 450, a determination is made whether the candidate relevance factor is above a configured relevance threshold. In certain embodiments, a configured relevance threshold is a configuration value associated with the relevance analysis engine 110. If the frequency of domain indicators are above the threshold processing continues to step 455 where the candidate domain is added to a set of one or more domains, otherwise processing continues to step 460. At step 460, a determination is made as to whether more candidate domains remain, if so the method returns to step 420, otherwise the method 400 ends. In certain embodiments, once all candidate domains have been processed, the relevant domains is reduced to a single most prominent domain.

In certain embodiments, relevancy (and hence relevance factor) may also be determined by the relevance processor 135 with a process that includes temporal factors (temporal closeness). In certain embodiments, a relevance factor is generated and used to determine strength of relevance. In certain embodiments, the relevancy is determined by multiplying the relevance factor by temporal factor, such that recent communications will have increased relevance in comparison to older communications; alternatively, communications temporally closer (temporal closeness) to the date and time of the information publication may have greater relevance. In certain embodiments, the relevant communications are organized and presented according to domains associated with the domains associated with the generated annotations for the communication. For example, communications with annotations generated based on the medical domain annotators would be presented in the medical domain section. In certain other embodiments, the relevancy is augmented by factors associated with the author of the communication; for example, communications posted by the author of the information or the staff of the author is considered highly relevant.

In certain embodiments, relevance processor 135 considers communications with annotations from non-topic domains as irrelevant. For example, communications with advertisements may not be considered relevant at all, even if the advertisement contains words and phrases from the topic domain. In these certain embodiments, additional annotators may be used (e.g., advertising annotator) and any annotations identified from such domain will affect the relevance evaluation by relevance processor 135 such that communications with such annotations are considered irrelevant, notwithstanding any other annotator indicating the communication is part of a relevant domain. In certain of these embodiments, the text analyzer 140 would be configured with annotators from a negative topic domain, such as the advertising domain, and annotations associated with the negative topic domain would be determined for each communication. Those communications containing such annotations would have a lower relevance score. In certain embodiments, communications containing such annotations would be considered irrelevant.

In certain embodiments, the relevance processor 135 would compare the annotations for each communication against all other communication annotations. Communications with similar annotations will be further evaluated to determine if the communications are duplicates, and if so, the duplicate communications would be removed. Providing de-duplication in this manner enables communications that are virtually the same, but not textually the same, to be considered duplicates and eliminated.

The embodiments disclosed herein provide an automated, objective determination of the relevancy of communications to published information. Standard queries comparing keywords to determine relevance fail to consider the valuable information provided in unstructured content. NLP text analytics, are configured for the domains associated with information, provide an objective determination that considers all the relevant unstructured information. Irrelevant information such as advertisements will not likely be part of the knowledge domain and accordingly annotations from the domain annotators would not be generated, thereby Additionally, the annotations from the NLP text analysis provides information for proper categorization of communications. The embodiments disclosed herein enable the determination the relevance for any new unstructured information published, not just information in a very specific application.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The relevance analysis engine 110 may be implemented as hardware (e.g., hardware logic or circuitry), software, or a combination of hardware and software. In certain embodiments, the relevance analysis engine 110 has its own processor and memory.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 5:
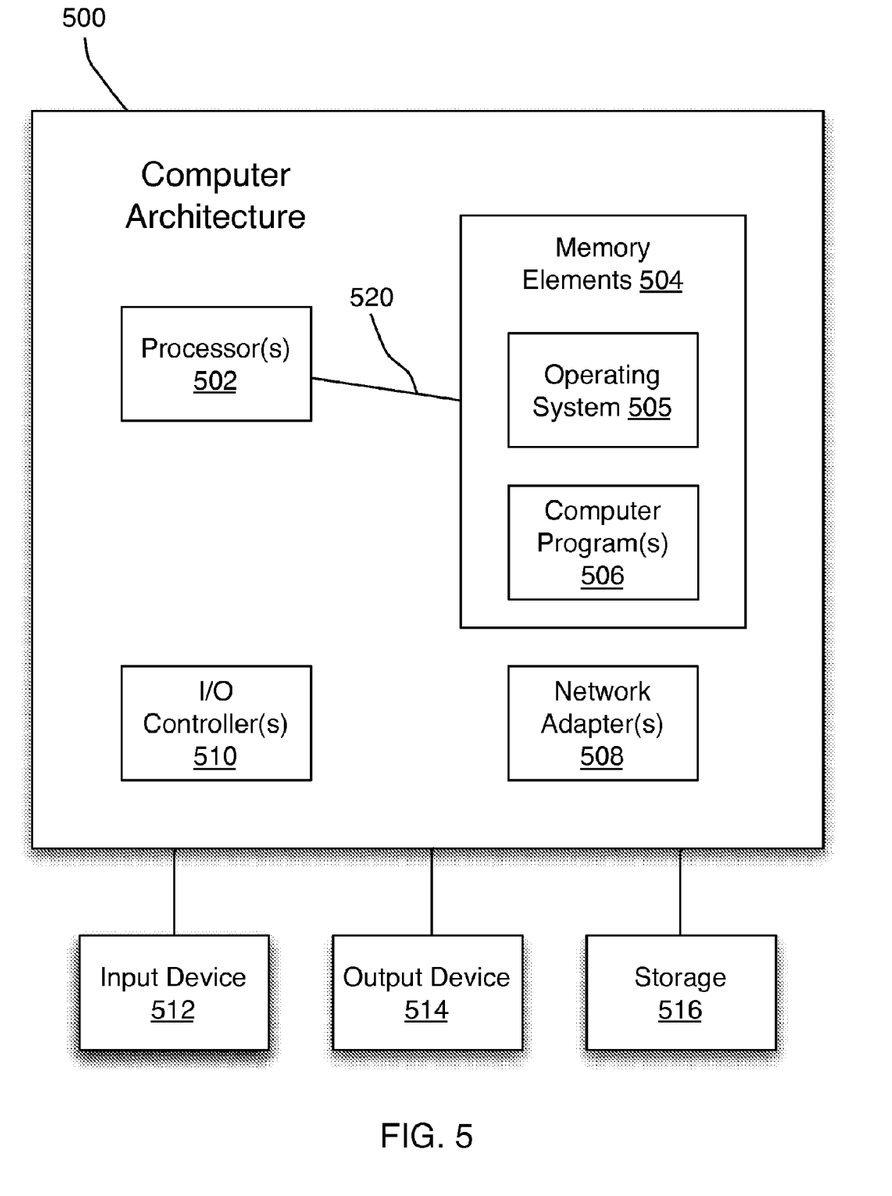
FIG. 5 illustrates a computer architecture that may be used in accordance with certain embodiments.

FIG. 5 illustrates a computer architecture 500 that may be used in accordance with certain embodiments. In certain embodiments, computing device 100 may implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., any type of storage device; a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A computer implemented method for presenting relevant communications about unstructured information, comprising:
    receiving the unstructured content that includes unstructured information and one or more communications for the unstructured information, by at least one computing processor;
    determining a relevant knowledge domain for the unstructured information, by the at least one computing processor;
    identifying at least one annotator related to the relevant knowledge domain based on a table of annotator to knowledge domain associations, wherein the at least one annotator generates annotations using dictionaries and rules, by the at least one computing processor;
    generating one or more first annotations for the unstructured information with a text analyzer using the at least one annotator, by the at least one computing processor;
    generating one or more second annotations for each of one or more communications with the text analyzer using the at least one annotator, by the at least one computing processor;
    determining a relevance factor for each of the one or more communications based in part upon a number of matches of the one or more second annotations to the one or more first annotations for the communication and based on whether any of the one or more first annotations and the one or more second annotations are associated with a negative topic domain; and
    organizing, by order of relevance, the one or more communications with the relevance factor greater than a threshold relevance, by the at least one computing processor.

2. The method of claim 1, wherein determining the relevance factor for each of the communications further comprises:
    increasing the relevance factor based on matching the one or more second annotations and the one or more first annotations.

3. The method of claim 1, wherein determining the relevance factor for each of the communications further comprises:
    generating one or more third annotations for each of the one or more communications with the text analyzer configured with at least one annotator from the negative topic domain; and
    decreasing the relevance factor based on matching the one or more second annotations and the one or more third annotations.

4. The method of claim 1, wherein presenting further comprises:
    determining one or more duplicate communications based on the one or more second annotations; and
    deleting the one or more duplicate communications.

5. The method of claim 1, wherein determining the relevant knowledge domain further comprises:
    for each of a plurality of candidate domains, repeatedly:
        generating one or more fourth annotations for the unstructured information with the text analyzer, wherein the text analyzer is configured with the at least one annotator related to the candidate domain; and determining a domain relevance factor based on a summation of the one or more fourth annotations; and selecting the relevant knowledge domain from the plurality of candidate domains based upon the relevance factor.

6. The method of claim 1, wherein determining the relevance factor for each of the communications further comprises:

increasing the relevance factor based upon temporal closeness with unstructured information.

7. The method of claim 1, wherein determining the relevance factor for each of the communications further comprises:

modifying the relevance factor based upon one or more authors of each communication.

\* \* \* \* \*